US009441566B2

(12) United States Patent
Takano et al.

(10) Patent No.: US 9,441,566 B2
(45) Date of Patent: Sep. 13, 2016

(54) EXHAUST EMISSION PURIFICATION CONTROL DEVICE FOR ENGINE

(71) Applicant: HONDA MOTOR CO., LTD., Tokyo (JP)

(72) Inventors: Yuki Takano, Wako (JP); Shinji Fujita, Wako (JP); Shinya Nakano, Wako (JP); Satoko Sakiyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 323 days.

(21) Appl. No.: 14/156,757

(22) Filed: Jan. 16, 2014

(65) Prior Publication Data

US 2014/0294678 A1    Oct. 2, 2014

(30) Foreign Application Priority Data

Mar. 29, 2013  (JP) ................................. 2013-075331
Mar. 29, 2013  (JP) ................................. 2013-075334

(51) Int. Cl.
| | |
|---|---|
| *F01N 3/00* | (2006.01) |
| *F02D 41/14* | (2006.01) |
| *F02D 41/02* | (2006.01) |
| *F01N 3/22* | (2006.01) |
| *F01N 11/00* | (2006.01) |
| *F02D 41/24* | (2006.01) |

(52) U.S. Cl.
CPC .............. *F02D 41/1454* (2013.01); *F01N 3/22* (2013.01); *F01N 11/007* (2013.01); *F02D 41/0295* (2013.01); *F01N 2550/03* (2013.01); *F01N 2550/14* (2013.01); *F01N 2570/16* (2013.01); *F01N 2900/0421* (2013.01); *F02D 41/2403* (2013.01); *F02D 2200/0814* (2013.01); *Y02T 10/47* (2013.01); *Y10T 29/49345* (2015.01)

(58) Field of Classification Search
USPC ......... 60/274, 276, 277, 285, 286, 289, 290, 60/291, 292, 293
See application file for complete search history.

(56) References Cited

U.S. PATENT DOCUMENTS 5,724,809 A * 3/1998 Mitsutani .............. F01N 11/007
                                                    60/276
6,351,942 B1* 3/2002 Nishimura .......... F02D 41/1475
                                                    60/285
6,898,927 B2* 5/2005 Morinaga ............. F01N 3/2006
                                                    123/688

(Continued)

FOREIGN PATENT DOCUMENTS

| JP | 2000-54826 A | 2/2000 |
|---|---|---|
| JP | 2002-309928 A | 10/2002 |

*Primary Examiner* — Binh Q Tran
(74) *Attorney, Agent, or Firm* — Birch, Stewart, Kolasch & Birch, LLP

(57) ABSTRACT

An exhaust emission purification control device for an engine that accurately estimates an accumulated oxygen amount of a catalyst at a terminating time of a reduction treatment which includes a secondary air injector that injects secondary air within an exhaust path, a sensor which detects an air-fuel ratio in a downstream side of a catylyst, a count-value accumulator which estimates an accumulated oxygen amount (a count value) in the catalyst during the secondary air injection, and a rich spike controller which performs rich injection after the secondary air injection. The device includes a count-value corrector that multiplies the count value after the secondary air injection by a correction coefficient derived from an output value $SVO_2$ of the $O_2$ sensor during termination of reduction treatment, so as to estimate the accumulated oxygen amount during the termination of the reduction treatment.

12 Claims, 7 Drawing Sheets

(56) References Cited

U.S. PATENT DOCUMENTS

| | | | |
|---|---|---|---|
| 6,978,600 B2* | 12/2005 | Hirooka | F01N 3/22 60/274 |
| 9,133,785 B2* | 9/2015 | Kociba | F02D 41/123 |
| 9,181,837 B2* | 11/2015 | Kondo | F01N 3/22 |
| 2004/0112043 A1 | 6/2004 | Matsubayashi et al. | |

* cited by examiner

EXHAUST EMISSION PURIFICATION CONTROL DEVICE FOR ENGINE

CROSS-REFERENCE TO RELATED APPLICATIONS

The present application claims priority under 35 USC 119 to Japanese Patent Application No. 2013-075334 filed Mar. 29, 2013 and Japanese Patent Application No. 2013-075331 filed Mar. 29, 2013 the entire contents of which are hereby incorporated by reference.

BACKGROUND OF THE INVENTION

1. Field of the Invention

The present invention relates to an exhaust emission purification control device for an engine. More specifically, to an exhaust emission purification control device for an engine that estimates an accumulated oxygen amount in a catalyst using a counter. In addition, the present invention relates to an exhaust emission purification device for an engine that is preferred to be used in a vehicle (such as a motorcycle) with an internal combustion engine.

2. Description of Background Art

A method for estimating an accumulated oxygen amount in a catalyst using a counter is used in, for example, an exhaust emission purification device that performs air-fuel ratio control of an oxygen sensor in the downstream of the catalyst. During operation a vehicle with this type of exhaust emission purification device, when air is injected into an exhaust system by, for example, exhaust secondary air or so-called Air Injection (AI), then oxygen is accumulated in the catalyst. Immediately after this, the air-fuel ratio of the exhaust gas that passes through the catalyst is liable to be shifted to the lean side by the influence of the oxygen accumulated in the catalyst. Accordingly, in order to revert to the ordinary air-fuel ratio control, it is necessary to reduce the catalyst until the accumulated oxygen amount in the catalyst becomes an appropriate amount. More specifically, a reduction treatment is to perform fuel injection with an air-fuel ratio richer than stoichiometric (theoretical air-fuel ratio). This is a treatment that supplies unburnt gas to the catalyst so as to reduce the accumulated oxygen.

When the reduction treatment is performed, there is a need for terminating the reduction treatment as early as possible because it is easier to drive in accordance with requests of a rider in the ordinary air-fuel ratio control. In order to have an early termination of the reduction treatment, it is preferred to supply fuel as rich as possible. However, excessively rich fuel may cause unburnt gas remaining in the exhaust gas after the catalyst. Performing the rich injection corresponding to the accumulated oxygen amount in the catalyst is important to ensure compatibility between shortening the time of the reduction treatment and high emission performance. Accurately detecting or estimating the accumulated oxygen amount in the catalyst allows correspondingly adjusting a rich-injection correction coefficient during the reduction treatment. Methods for estimating the accumulated oxygen amount in the catalyst include, for example, a technology that estimates the accumulated oxygen amount using a counter while performing lean operation as disclosed in JP-A No. 2000-054826.

Meanwhile, assume that the AI, the reduction treatment, and a normal termination of the reduction treatment are always performed as one sequential set. It is only necessary to perform a count only with addition during performing the AI and then reset the counter to 0 at the normal termination of the reduction treatment. However, in the case where an operating range changes during the reduction treatment, for example, in the case where operations of opening the throttle after starting to move from the stop state, suddenly closing and then opening the throttle again, alternatively, operations of opening the throttle after a shift-up, suddenly closing and then opening the throttle again is performed, the reduction treatment after the first-time AI performance is forcibly terminated, that is, aborted in the middle, and then the second-time AI is performed. In this case, the accumulated oxygen amount at the time point when the first-time reduction is aborted is used as the initial value when the second-time AI is started. Thus, it is likely to improve the estimation accuracy of the accumulated oxygen amount.

As a means for estimating the accumulated oxygen amount at the point in time when the first-time reduction is aborted, JP-A No. 2000-054826 discloses a method for estimating the accumulated oxygen amount by subtraction of the count value during the rich injection in the middle of the reduction treatment.

However, with respect to a subtraction counter in the method of JP-A No. 2000-054826, the control needs to be established taking into consideration the operating state during the reduction treatment, environmental factors, degree of deterioration of the catalyst, and similar parameter. In the past, there is a problem with respect to setting of the control, setting a table for the subtraction counter, and similar settings that are laborious.

JP-A No. 2002-309928 discloses a known device as a conventional exhaust emission purification device for an engine. This device described in JP-A No. 2002-309928 is an air-fuel ratio control system where only one $O_2$ sensor is disposed in a downstream of a catalyst, and increases the fuel injection amount until the output of the $O_2$ sensor in the downstream of the catalyst (hereinafter referred to as $SVO_2$) becomes a rich output during reduction of the catalyst. The control that performs a so-called rich spike is disclosed.

JP-A No. 2002-309928 does not disclose details. However, in the O2 feedback system in the downstream of the catalyst, when an accumulated oxygen amount of the catalyst increases and then a reduction treatment is performed, the air-fuel ratio in the downstream of the catalyst is shifted to the lean side due to the influence of the oxygen accumulated in the catalyst. This does not allow an ordinary $O_2$ feedback control. Accordingly, the $O_2$ feedback control is temporarily stopped. A fuel injection amount increasing correction on the catalytic reduction treatment is performed in an open-loop control until the $SVO_2$ becomes a stoichiometric output (with the theoretical air-fuel ratio) or a rich output. When the $SVO_2$ has become a stoichiometric output or a rich output, the control returns to the ordinary $O_2$ feedback control.

When the reduction treatment is performed, an ordinary air-fuel ratio control is preferred for driving in accordance with requests of a rider. There is a need for terminating the reduction treatment as early as possible so as to revert to the ordinary fuel injection control. In order to early terminate the reduction treatment, it is effective to ensure an air-fuel ratio as rich as possible during the rich spike. However, if an excessively rich air-fuel ratio is provided for the oxidation capacity of the catalyst at that time point, unburnt gas is liable to be exhausted to the downstream of the catalyst. Accordingly, a margin to avoid an excessively rich air-fuel ratio is set during the rich spike so as not to output unburnt gas. A problem is that in order to have an early termination of the reduction treatment, this margin is required to be omitted to the extent possible.

Furthermore, when the control is switched to the $O_2$ feedback control after the catalytic reduction treatment is terminated, there is a time lag until the output of the $O_2$ sensor in the downstream of the catalyst responds. Here, a control input is calculated from a deviation between the $SVO_2$ output at the time point of switching to the $O_2$ feedback and the target $SVO_2$ output of 500 mV, as the deviation of the $O_2$ feedback. Accordingly, an excessive correction to the rich side may occur.

SUMMARY AND OBJECTS OF THE INVENTION

With these problems understood, it is an object of an embodiment of the present invention to provide an exhaust emission purification control device for an engine that accurately estimates the accumulated oxygen amount of the catalyst during the termination of the reduction treatment using a simple method.

According to an embodiment of the present invention, an exhaust emission purification control device for an engine includes a secondary air injector (1000), an $O_2$ sensor (52), accumulated-oxygen-amount count means (130), and reduction treatment means (118). The secondary air injector (1000) is disposed in an upstream side of a catalyst (50). The $O_2$ sensor (52) is disposed in a downstream of the catalyst (50). The catalyst (50) is disposed at an exhaust pipe (32) of an engine (28). The secondary air injector (1000) is configured to inject secondary air into an exhaust path. The $O_2$ sensor (52) is configured to detect an air-fuel ratio. The accumulated-oxygen-amount count means (130) is for estimating an accumulated-oxygen-amount count value in the catalyst (50) during secondary air injection. The reduction treatment means (118) is for performing rich injection after the secondary air injection. The exhaust emission purification control device for the engine further includes means to estimate accumulated amount at terminating time of reduction treatment (132). The means to estimate accumulated amount at terminating time of reduction treatment (132) is for multiplying the accumulated-oxygen-amount count value after the secondary air injection by a correction coefficient so as to estimate the accumulated oxygen amount at a terminating time of reduction treatment. The correction coefficient is derived from an output of the $O_2$ sensor (52) at the terminating time of the reduction treatment.

According to an embodiment of the present invention, an estimation value of an accumulated amount at the terminating time of the reduction when the reduction treatment is forcibly terminated due to reintroduction of the secondary air is set to a counter initial value during the reintroduction of the secondary air.

According to an embodiment of the present invention, the counter (126) is reset to zero in a stage where the output of the $O_2$ sensor (52) has reached a theoretical air-fuel ratio output after the reduction treatment.

According to an embodiment of the present invention, the correction coefficient at terminating time of the reduction treatment is set to decrease with increasing output of the $O_2$ sensor (52).

According to an embodiment of the present invention, a relationship of the correction coefficient to the output of the $O_2$ sensor (52) at the terminating time of the reduction treatment has a property where the correction coefficient steeply decreases with increasing output of the $O_2$ sensor (52) in a region with a low output of the $O_2$ sensor (52) while the correction coefficient gently decreases with increasing output of the $O_2$ sensor (52) in a region with a high output of the $O_2$ sensor (52).

According to an embodiment of the present invention, an exhaust emission purification control device for an engine includes a throttle (38), an $O_2$ sensor (52), injection-amount reducing means (1004, 1005), accumulated-oxygen-amount count means (130), and reduction treatment means (118). The throttle (38) is disposed at an exhaust pipe (32) of an engine (28). The throttle (38) is configured to adjust an intake air volume. The $O_2$ sensor (52) is disposed in a downstream side of a catalyst (50). The catalyst (50) is disposed at the exhaust pipe (32). The $O_2$ sensor (52) is configured to detect an air-fuel ratio. The injection-amount reducing means (1004, 1005) is for cutting or reducing the fuel injection amount by running lean in a completely closed state of the throttle (38). The accumulated-oxygen-amount count means (130) is for estimating an accumulated-oxygen-amount count value in the catalyst (50) during reducing the injection amount. The reduction treatment means (118) is for performing rich injection after the reduction in injection amount. The exhaust emission purification control device for the engine further includes means to estimate accumulated amount at terminating time of reduction treatment (132). The means to estimate accumulated amount at terminating time of reduction treatment (132) is for multiplying the accumulated-oxygen-amount count value after the reduction in injection amount by a correction coefficient so as to estimate the accumulated oxygen amount at a terminating time of reduction treatment. The correction coefficient is derived from an output of the $O_2$ sensor (52) at the terminating time of the reduction treatment.

According to an embodiment of the present invention, during performing AI, the accumulated oxygen amount is estimated with addition by the counter. This value is maintained during the reduction treatment. The correction coefficient is derived from the output of the $O_2$ sensor during the normal state or the forced termination of the reduction treatment, and multiplied by the counter value of the accumulated oxygen amount. This allows estimation of the accumulated oxygen amount during the termination of the reduction treatment. The output of the $O_2$ sensor relates to the accumulated oxygen amount in the catalyst. Therefore, referring to the output of the $O_2$ sensor during the termination of the reduction treatment allows comparatively accurate estimation of the state of the catalyst. This eliminates the need for calculation of the accumulated oxygen amount in the catalyst during every reduction treatment while allowing estimation of the accumulated oxygen amount during the termination of the reduction treatment, thus accurately estimating the accumulated oxygen amount with a simple method.

According to an embodiment of the present invention, during the reinjection of the AI after the reduction treatment is forcibly terminated, the initial value of the counter is set properly. Accordingly, in the case where the reduction treatment is repeated, the reduction treatments for the second time and thereafter can be performed with appropriate rich injection control.

According to an embodiment of the present invention, also in the case where the estimation value of the accumulated oxygen amount is estimated to have a value equal to or more than zero at the terminating time of the reduction treatment, during performing an ordinary control, the counter is reset in the stage where the output of the $O_2$ sensor has reached the stoichiometric output. During subsequent AI injection, an appropriate count is possible from the counter value of zero.

According to an embodiment of the present invention, since the air-fuel ratio is shifted to the richer side as the output of the $O_2$ sensor increases, the accumulated oxygen amount in the catalyst is estimated to be low. Accordingly, setting the correction coefficient during the termination of the reduction treatment to decrease with increasing output of the $O_2$ sensor allows accurately setting the correction coefficient.

According to an embodiment of the present invention, the correction coefficient can be set accurately.

According to an embodiment of the present invention, during performing the fuel cut, or during performing the deceleration lean, the accumulated oxygen amount is estimated with addition by the counter. This value is maintained during the reduction treatment. The correction coefficient is derived from the output of the $O_2$ sensor during the normal termination or the forced termination of the reduction treatment, and multiplied by the counter value of the accumulated oxygen amount. This allows estimation of the accumulated oxygen amount during the termination of the reduction treatment. The output of the $O_2$ sensor relates to the accumulated oxygen amount in the catalyst Therefore, referring to the output of the $O_2$ sensor during the termination of the reduction treatment allows comparatively accurate estimation of the state of the catalyst. This eliminates the need for calculation of the accumulated oxygen amount in the catalyst during every reduction treatment while allowing estimation of the accumulated oxygen amount during the termination of the reduction treatment, thus accurately estimating the accumulated oxygen amount with a simple method.

It is an object of an embodiment of the present invention to provide an exhaust emission purification device for an engine that performs an $O_2$ feedback control based on the $SVO_2$ from the $O_2$ sensor in the downstream of the catalyst. The exhaust emission purification device for the engine ensures compatibility between early termination of the reduction treatment by providing a rich fuel injection amount as much as possible during the reduction treatment and prevention of the generation of unburnt gas in the downstream of the catalyst by an excessively rich air-fuel ratio. In addition, the exhaust emission purification device for the engine reduces errors of the control from the time of terminating the reduction treatment to the time of transition to the $O_2$ feedback control as much as possible.

According to an embodiment of the present invention, an exhaust emission purification device for an engine includes $O_2$ feedback control means (100) and reduction treatment means (118). The $O_2$ feedback control means (100) includes an $O_2$ sensor (52) configured to detect an air-fuel ratio in a downstream side of a catalyst (50). The catalyst (50) is disposed at an exhaust pipe (32) of an engine (28). The $O_2$ feedback control means (100) is for performing feedback control such that an output of the $O_2$ sensor (52) becomes a target value. The reduction treatment means (118) is for stopping the $O_2$ feedback control during a specific engine control for increasing an air volume injected into the exhaust pipe (32) and then multiplying a fuel injection amount after the specific engine control by a reduction-rich correction coefficient of an open-loop control. The $O_2$ feedback control is resumed during reduction treatment of the catalyst (50). The fuel injection amount is further multiplied by an $O_2$-feedback correction coefficient (KO2 (PID)). The $O_2$-feedback correction coefficient is derived based on a deviation between a target $O_2$ sensor output and a current $O_2$ sensor output.

According to an embodiment of the present invention, in a case where an output of the $O_2$ sensor (52) becomes a first output value (Vth1) lower than the target value, the gain of the $O_2$ feedback control is decreased.

According to an embodiment of the present invention, as the reduction-rich correction coefficient, a first rich correction coefficient (KCATRD (K1)) is provided at a starting time point of the reduction treatment and a second rich correction coefficient (KCATRD (K2)) is provided after a lapse of a predetermined time (Ta). The second rich correction coefficient (KCATRD (K2)) is lower than the first rich correction coefficient (KCATRD (K1)). The $O_2$ feedback control during the reduction treatment is started during a transition to the second rich correction coefficient (KCATRD (K2)).

According to an embodiment of the present invention, in a case where an output of the $O_2$ sensor (52) becomes a second output value (Vth2) lower than the target value (Vsto) of the $O_2$ feedback control, only the reduction treatment is terminated.

According to an embodiment of the present invention, regarding the $O_2$ sensor, the output $SVO_2$ of the $O_2$ sensor rapidly changes from the lean side to the rich side in proximity of the stoichiometric value (theoretical air-fuel ratio). Therefore, the output $SVO_2$ becomes the lean output during the reduction treatment. Thus, for example, setting the target value to $SVO_2$ in proximity of the stoichiometric value always causes the deviation in the feedback control, thus increasing the fuel amount. During the reduction treatment when the ordinary $O_2$ feedback control is originally difficult, the $O_2$ feedback control is inevitably performed at the same timing. This utilizes the deviation between the output $SVO_2$ of the $O_2$ sensor, which detects the air-fuel ratio in the downstream of the catalyst and the target value, so as to reduce the occurrence of the unburnt gas and perform the rich injection as much as possible in order to reduce the margin of the reduction-rich correction coefficient. This allows early termination of the reduction treatment.

According to an embodiment of the present invention, in the case where the output of the $O_2$ sensor becomes the first output value lower than the target value, the gain of the $O_2$ feedback control is decreased. This avoids the output value exceeding the target value, or occurrence of so-called overshooting.

According to an embodiment of the present invention, excessive fuel injection by the $O_2$ feedback control with the first rich correction coefficient is suppressed.

According to an embodiment of the present invention, when the reduction treatment has nearly ended, the increasing correction by the reduction treatment is terminated and only the $O_2$ feedback control is performed. This facilitates convergence to the target value while reducing overshooting.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a description will be given of an exemplary embodiment where an exhaust emission purification control device for an engine according to the present invention is applied to, for example, a motorcycle by referring to FIGS. 1 to 7.

First, a description will be given of a motorcycle 12 with an exhaust emission purification control device 10 for an engine according to this embodiment by referring to FIG. 1.

Figure 1:
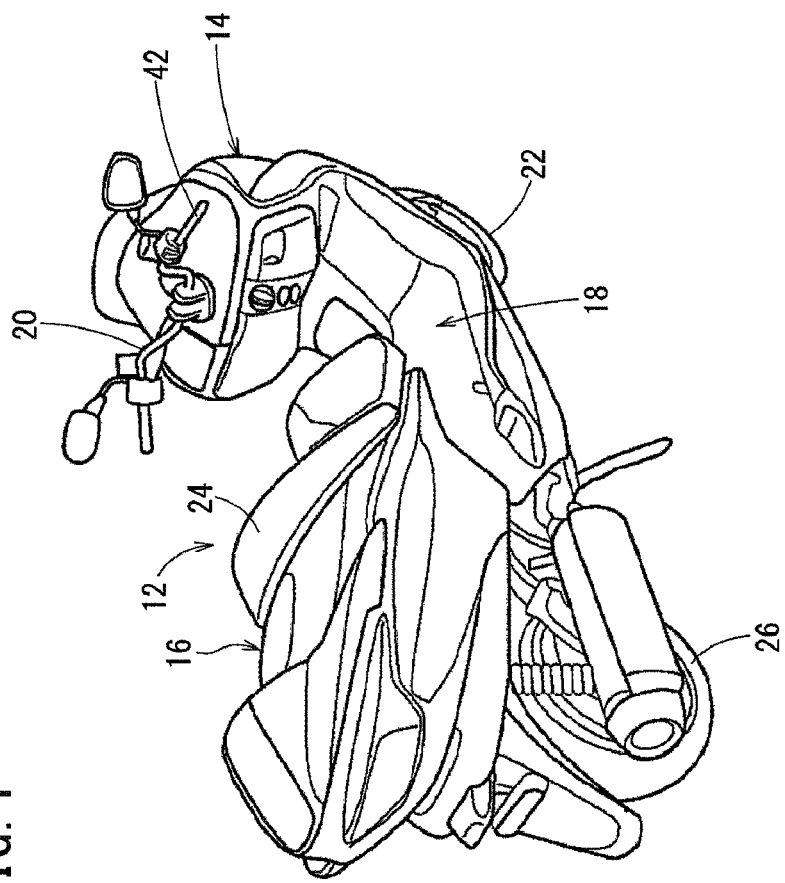
FIG. 1 is a perspective view illustrating one example of a motorcycle with an exhaust emission purification control device according to this embodiment.

The motorcycle 12 is constituted such that, as illustrated in FIG. 1, a vehicle-body front part 14 and a vehicle-body rear part 16 are coupled together via a floor part 18 in a low position. The vehicle-body front part 14 includes an upper part on which a handlebar 20 is turnably mounted and a lower part to which a front wheel 22 is journaled. The vehicle-body rear part 16 includes an upper part on which a seat 24 is mounted and a lower part to which a rear wheel 26 is journaled.

Figure 2:
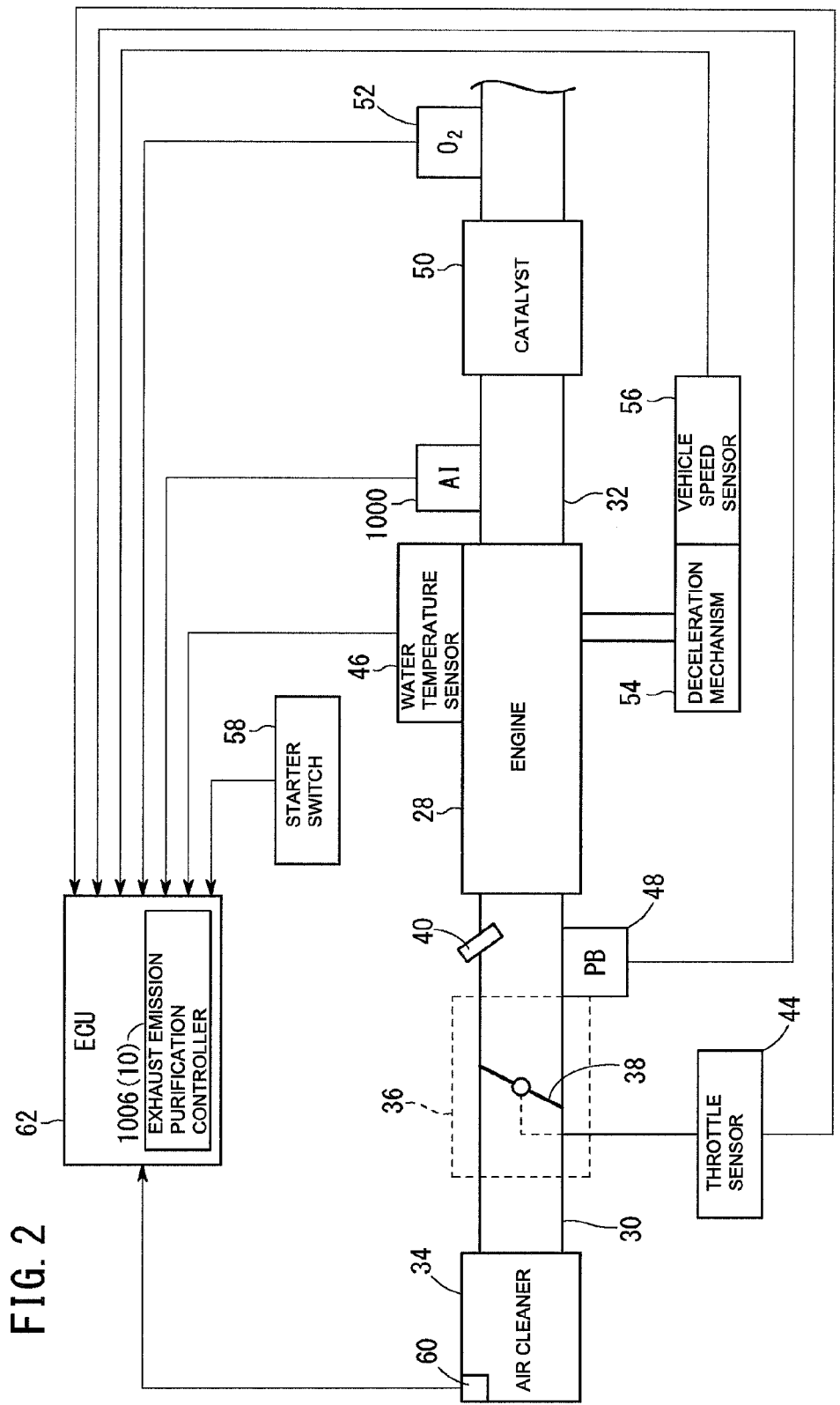
FIG. 2 is a block diagram illustrating one example of a control system of an engine for the motorcycle.

The motorcycle 12 includes an engine 28 where, as schematically illustrated in FIG. 2, an intake air pipe 30 and an exhaust pipe 32 are disposed. The intake air pipe 30 is plumbed between the engine 28 and an air cleaner 34. At the intake air pipe 30, a throttle body 36 is provided with a throttle valve 38. On the intake air pipe 30, a fuel injection valve 40 is disposed between the engine 28 and the throttle body 36.

The throttle valve 38 is turned corresponding to a turning operation of a throttle grip 42 (see FIG. 1). The turning amount (the opening angle of the throttle valve 38) is detected by the throttle sensor 44. The throttle valve 38 is opened and closed corresponding to the operation of the throttle grip 42 by a rider, so as to vary the air volume supplied to the engine 28.

The engine 28 includes a water temperature sensor 46 that senses an engine cooling water temperature. The intake air pipe 30 includes a PB sensor 48 that senses an intake air pressure (intake air vacuum). In the upper stream of a catalyst 50 installed on the exhaust pipe 32 of the engine 28, a secondary air injector 1000 is disposed to inject air from the air cleaner 34 to the exhaust pipe 32 as secondary air. In the downstream of the catalyst 50 installed on the exhaust pipe 32 of the engine 28, an $O_2$ sensor 52 (air-fuel-ratio detecting means) is disposed to detect the air-fuel ratio in the downstream side of the catalyst 50. The oxygen concentration detected by the $O_2$ sensor 52 corresponds to the actual air-fuel ratio of the exhaust gas after passing through the catalyst 50. In addition, the engine 28 includes a vehicle speed sensor 56 that senses a vehicle speed based on the rotational number of the output gear of a deceleration mechanism 54. A starter switch 58 is a switch that starts the engine 28 by operation of an ignition key. Furthermore, an atmospheric pressure sensor 60 is disposed in a position far from the intake air pipe 30 in the air cleaner 34.

Figure 3:
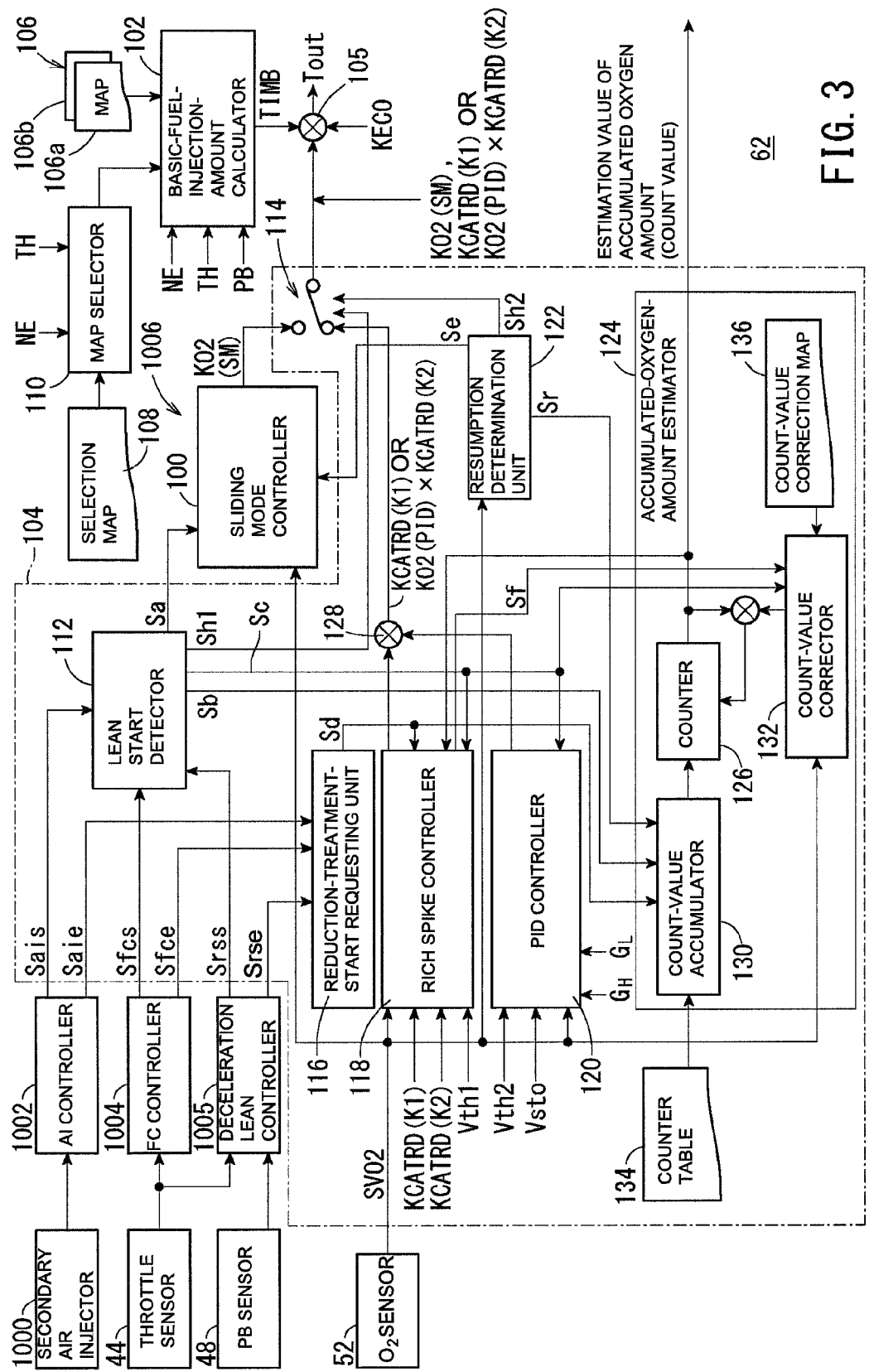
FIG. 3 is a functional block diagram illustrating a configuration of an exhaust emission purification controller with a lean management unit.

An engine control device (Engine Control Unit: ECU 62) includes, as illustrated in FIG. 3, a secondary air injection (AI) controller 1002, which performs a specific engine control, a fuel cut (FC) controller 1004, and a deceleration lean controller 1005, and further includes an exhaust emission purification controller 1006, which functions as the exhaust emission purification control device 10 according to this embodiment.

The AI controller 1002 drives the secondary air injector 1000 during the period when a predetermined condition for injecting secondary air is satisfied, so as to inject air from the air cleaner 34 as the secondary air into the upstream side of the catalyst 50 in the exhaust pipe 32. This AI controller 1002 outputs an AI start signal Sais prior to starting the injection of the secondary air or at the starting time point of the injection, and outputs an AI end signal Saie at the time point of ending the injection of the secondary air.

The FC controller 1004 performs fuel cut control that stops fuel injection during the period when the predetermined condition for performing the FC control is satisfied, for example, a throttle angle TH is zero (completely closed). The FC controller 1004 outputs an FC-control start signal Sfcs prior to starting the fuel cut control or at the starting time point of the performance, and outputs an FC-control end signal Sfce at the time point of ending the fuel cut control.

The deceleration lean controller 1005 performs deceleration lean such as reducing the basic injection pulse width at the period when a predetermined condition for deceleration lean is satisfied based on, for example, the decreased amount of the throttle angle TH and the variation amount of the intake air pressure. The deceleration lean controller 1005 outputs a deceleration-lean start signal Srss prior to starting the deceleration lean or at the starting time point of the performance, and outputs a deceleration-lean end signal Srse at the time point of ending the deceleration lean.

The exhaust emission purification controller 1006 includes a sliding mode controller 100 ($O_2$ feedback control means), a basic-fuel-injection-amount calculator 102, and a lean management unit 104.

The sliding mode controller 100 preliminarily establishes a switching straight line expressed by a linear function that takes a plurality of state amounts of a controlled object as variables. A high gain control is performed to ensure convergence of the state amounts on the switching straight line at high speed (reaching mode). Furthermore, what is called an equivalent control input is used to restrain the state amounts on the switching straight line and to ensure convergence of the state amounts to a required equilibrium point (convergence point) on the switching straight line (a sliding mode). This is a reconfigurable feedback control method.

This sliding mode control has excellent characteristics where a convergence of the plurality of state amounts of the controlled object on the switching straight line is once established; this allows a stable convergence of the state amounts at the equilibrium point on the switching straight line with almost no influence of disturbance and similar cause.

Assume that a correction amount for the air-fuel ratio of the engine 28 is obtained such that the concentration of a specific component, for example, the oxygen concentration of the exhaust gas in the downstream side of the catalyst 50 is set to a predetermined proper value. In this case, for example, the concentration value of the specific component of the exhaust gas in the downstream side of the catalyst 50 and the change rate of the concentration are assumed to be state amounts of an exhaust system as the controlled object. The correction amount for the air-fuel ratio is obtained using the sliding mode control such that the respective state amounts converge to the equilibrium point on the switching straight line (a point where the concentration value and the change rate of the concentration respectively become the predetermined proper value and "0"). Obtaining the correction amount for the air-fuel ratio using the sliding mode control allows accurately setting the concentration of the specific component of the exhaust gas in the downstream side of the catalyst 50 to the predetermined proper value, compared with a conventional PID control and similar control. The output from this sliding mode controller 100 is input to a first multiplier 105 through a switching unit 114 as a correction coefficient $KO_2$ (SM).

The basic-fuel-injection-amount calculator 102 obtains a standard fuel injection amount specified by an engine rotational number NE, the throttle angle TH, the intake air pressure PB, using a basic fuel injection map 106. The basic-fuel-injection-amount calculator 102 calculates a basic fuel injection amount TIMB by correcting the standard fuel injection amount corresponding to an effective opening area of the throttle valve 38.

The basic fuel injection map 106 includes a first basic fuel injection map 106a and a second basic fuel injection map 106b. The first basic fuel injection map 106a is based on the engine rotational number NE and the throttle angle TH. The second basic fuel injection map 106b is based on the engine rotational number NE and the intake air pressure PB. Therefore, this exhaust emission purification controller 1006 includes a map selector 110. The map selector 110 selects and indicates the basic fuel injection map 106 to be used among the first basic fuel injection map 106a and the second basic fuel injection map 106b using a selection map 108 based on the engine rotational number NE and the throttle angle TH. In the selection map 108, indexes of the basic fuel injection map 106 to be used are arrayed. The selection map 108 includes a region where the first basic fuel injection map 106a is to be used and a region where the second basic fuel injection map 106b is to be used. The map selector 110 selects the basic fuel injection map 106 to be used using the selection map 108 based on the engine rotational number NE and the throttle angle TH to be input, and outputs the selection result. In the case where the engine rotational number NE is low, there is a high possibility of selecting the first basic fuel injection map 106a. In the case where the engine rotational number NE is high, there is a high possibility of selecting the second basic fuel injection map 106b.

Accordingly, the basic-fuel-injection-amount calculator 102 obtains the standard fuel injection amount specified by the engine rotational number NE, the throttle angle TH, and the intake air pressure PB, using the basic fuel injection map 106 selected by the map selector 110. The basic-fuel-injection-amount calculator 102 corrects the standard fuel injection amount corresponding to the effective opening area of the throttle valve 38, so as to calculate the basic fuel injection amount TIMB. This basic fuel injection amount TIMB is corrected with the correction coefficient $KO_2$ (SM) from the sliding mode controller 100 and an environmental correction coefficient KECO that includes the water temperature, the intake air temperature, the atmospheric pressure, and similar parameter, so as to be output as a fuel injection time Tout.

The lean management unit 104 includes a lean start detector 112, the switching unit 114, a reduction-treatment-start requesting unit 116, a rich spike controller 118 (reduction treatment means), a PID controller 120, a resumption determination unit 122, and an accumulated-oxygen-amount estimator 124.

The lean start detector 112 outputs a control-stop request signal Sa to the sliding mode controller 100, outputs a first switching signal Sh1 to the switching unit 114, and outputs a count start signal Sb to the accumulated-oxygen-amount estimator 124, based on input of the AI start signal Sais from the AI controller 1002, the FC-control start signal Sfcs from the FC controller 1004, or the deceleration-lean start signal Srss from the deceleration lean controller 1005.

Furthermore, the lean start detector 112 outputs a forced termination signal Sc to the rich spike controller 118, the PID controller 120, and the accumulated-oxygen-amount estimator 124 in the case where the AI start signal Sais, the FC-control start signal Sfcs, or the deceleration-lean start signal Srss is input during the reduction treatment.

The sliding mode controller 100 temporarily stops the air-fuel ratio control based on input of the control-stop request signal Sa from the lean start detector 112. The switching unit 114 switches to the output from the lean management unit 104 based on the input of the first switching signal Sh1. The accumulated-oxygen-amount estimator 124 estimates the accumulated oxygen amount in the catalyst 50 from the time point when starting the lean, for example, a secondary air injection, using a counter 126. Furthermore, the accumulated-oxygen-amount estimator 124 estimates the accumulated oxygen amount in the catalyst 50 during termination of the reduction treatment. The specific processing will be described later.

The reduction-treatment-start requesting unit 116 outputs a reduction-treatment start signal Sd to the rich spike controller 118 and the accumulated-oxygen-amount estimator 124 based on input of the AI end signal Saie from the AI controller 1002, the FC-control end signal Sfce from the FC controller 1004, or the deceleration-lean end signal Srse from the deceleration lean controller 1005.

The rich spike controller 118 performs rich spike (rich injection performed such that the fuel injection amount temporarily has a richer air-fuel ratio than the ordinary air-fuel ratio in order to reduce oxygen accumulated in the catalyst 50) in the combustion chamber of the engine 28 based on the input of the reduction-treatment start signal Sd from the reduction-treatment-start requesting unit 116.

Figure 4:
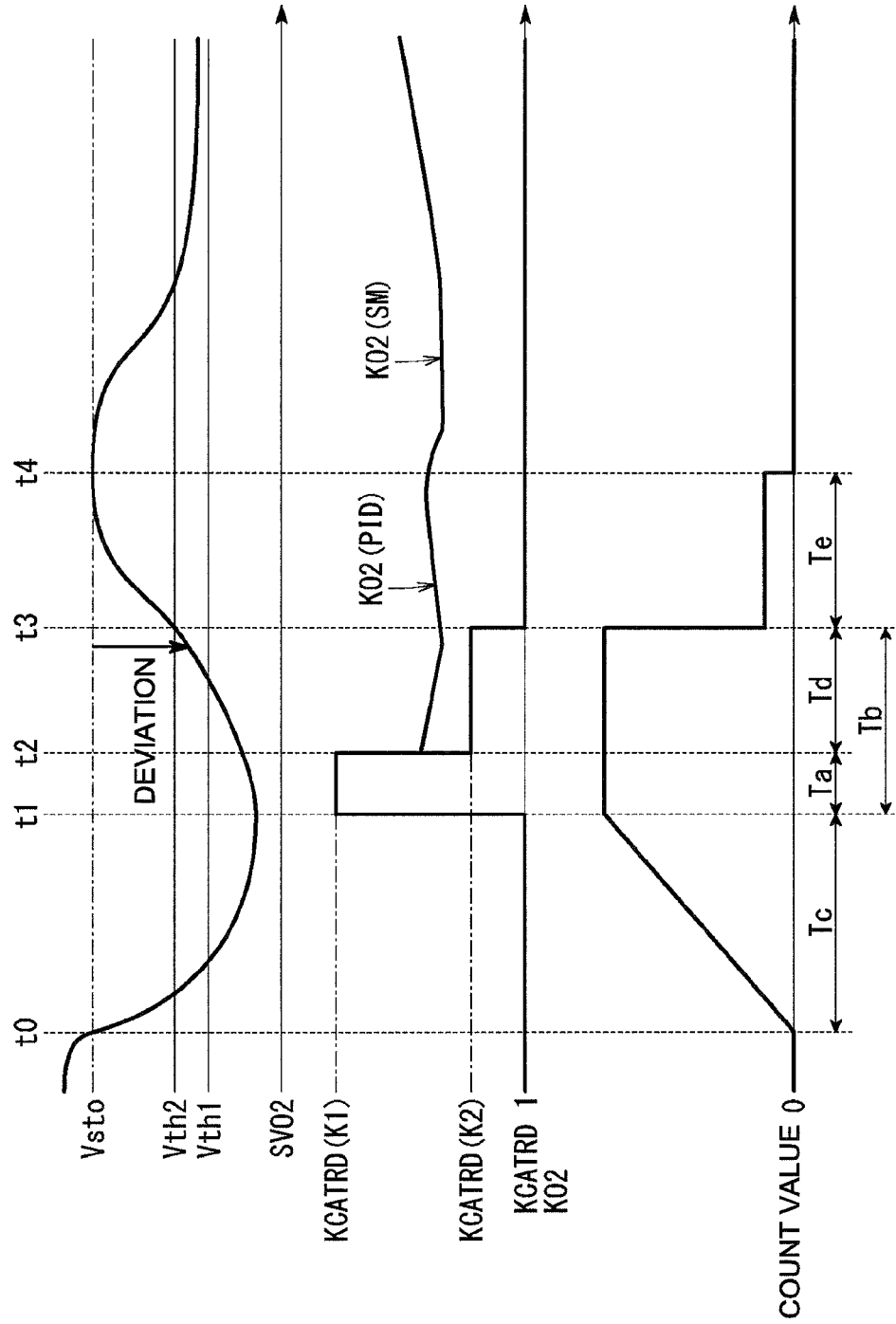
FIG. 4 is a timing chart illustrating a processing operation of the exhaust emission purification control device (the exhaust emission purification controller) according to this embodiment, more specifically, a processing operation in the case where reduction treatment is normally terminated.

This rich spike controller 118 outputs a reduction correction coefficient KCATRD that is set in advance and changes as time lapses. More specifically, for example, as illustrated in FIG. 4, a first reduction correction coefficient KCATRD (K1) (a first rich correction coefficient) is output from a reduction-treatment starting time point t1 over a predetermined time Ta. In this case, the rich spike controller 118 outputs the first reduction correction coefficient KCATRD (K1) corresponding to a count value from the accumulatedoxygen-amount estimator 124, which will be described later, based on the input of the reduction-treatment start signal Sd. For example, the rich spike controller 118 corrects a preliminarily set fixed value corresponding to the count value, and outputs the corrected value as the first reduction correction coefficient KCATRD (K1). The correction is performed such that the first reduction correction coefficient KCATRD (K1) increases with increasing count value (see FIG. 7). Subsequently, from a time point t2 after a lapse of the predetermined time Ta, a second reduction correction coefficient KCATRD (K2) (a second rich correction coefficient) is read and output. The first reduction correction coefficient KCATRD (K1) and the second reduction correction coefficient KCATRD (K2) have a magnitude relationship satisfying the first reduction correction coefficient KCATRD (K1)> the second reduction correction coefficient KCATRD (K2). Except during the output period (reduction treatment period Tb) of the first reduction correction coefficient KCATRD (K1) and the second reduction correction coefficient KCATRD (K2), the rich spike controller 118 outputs an initial value (=1). Furthermore, the rich spike controller 118 starts the PID controller 120 at a time point after a lapse of the predetermined time Ta.

The PID controller 120 performs PID control (feedback control) such that the deviation between the output value $SVO_2$ of the $O_2$ sensor 52 and a target value Vsto (stoichiometric output) becomes 0 (zero). Especially, in this embodiment, in the case where the output value $SVO_2$ is less than a first threshold Vth1 (a first output value) (the deviation is large), the PID control is performed at a high gain GH. In the case where the output value ($SVO_2$) is equal to or more than the first threshold Vth1 (the deviation is small), the PID control is performed at a low gain GL.

The output from the rich spike controller 118 (the second reduction correction coefficient KCATRD (K2)) and the output from the PID controller 120 (a PID correction coefficient $KO_2$ (PID) an $O_2$-feedback correction coefficient) are multiplied together at a second multiplier 128 in the middle way. This result is input to the first multiplier 105 as the correction coefficient $KO_2$ (PID)×KCATRD (K2). Accordingly, the basic fuel injection amount TIMB is corrected with the correction coefficient $KO_2$ (PID)×KCATRD (K2) from the lean management unit 104 and with the environmental correction coefficient KECO, which includes the water temperature, the intake air temperature, the atmospheric pressure, and similar parameter, and then output as the fuel injection time Tout. The output value $SVO_2$ of the $O_2$ sensor 52 changes toward the target value Vsto.

More specifically, in the period with the large deviation (the output value $SVO_2$ is less than the first threshold Vth1), the PID control is performed at a high gain GH. Therefore, the output value $SVO_2$ converges to the target value Vsto at a high speed. From the stage with the decreased deviation (the output value $SVO_2$ is equal to or more than the first threshold Vth1), the PID control is performed at a low gain GL. This reduces overshooting (a phenomenon where the output value exceeds the target value Vsto).

While the PID controller 120 is stopped, the initial value (=1) indicative of stopping is output from the PID controller 120. Therefore, the rich spike controller 118 and the PID controller 120 each output the initial value (=1) from a starting time point t0 to an ending time point t1 of the injection of the secondary air, the FC control, or the deceleration lean. Accordingly, in this period (a lean period Tc), the basic fuel injection amount TIME is corrected with the environmental correction coefficient KECO, and the corrected result is output as the fuel injection time Tout.

From the ending time point t1 described above over the predetermined time Ta, the rich spike controller 118 outputs the first reduction correction coefficient KCATRD (K1) while the PID controller 120 outputs the initial value (=1). Therefore, in this period, the basic fuel injection amount TIMB is corrected with the first reduction correction coefficient KCATRD (K1) and the environmental correction coefficient KECO. The corrected result is output as the fuel injection time Tout. Accordingly, the fuel injection amount is considerably increased.

From the time point t2 when the predetermined time Ta ends, the rich spike controller 118 outputs the second reduction correction coefficient KCATRD (K2) smaller than the first reduction correction coefficient KCATRD (K1) while the PID controller 120 outputs the PID correction coefficient $KO_2$. Accordingly, in this period Td, the basic fuel injection amount TIMB is corrected with the second reduction correction coefficient KCATRD (K2), the PID correction coefficient $KO_2$, and the environmental correction coefficient KECO. The corrected result is output as the fuel injection time Tout. More specifically, an increase in fuel injection amount by the second reduction correction coefficient KCATRD (K2) is compensated with the PID correction coefficient $KO_2$. Accordingly, the output value $SVO_2$ converges to the target value Vsto at a high speed and in addition without overshooting.

In a stage where the output value $SVO_2$ becomes a second threshold Vth2 (a second output value), the rich spike controller 118 stops the rich spike control. Subsequently, the rich spike controller 118 outputs the initial value of "1" as the reduction correction coefficient KCATRD and outputs a normal termination signal Sf (a signal indicative of normal termination of the reduction treatment) to the accumulated-oxygen-amount estimator 124. The first threshold Vth1, the second threshold Vth2, and the target value Vsto have a magnitude relationship that satisfies Vth1≤Vth2<Vsto.

In a period Te from a stopping time point t3 for the rich spike control until the $SVO_2$ reaches the target value Vsto, the rich spike controller 118 outputs the initial value (=1) while the PID controller 120 outputs the PID correction coefficient $KO_2$ (PID). Accordingly, in this period Te, the basic fuel injection amount TIMB is corrected with the PID correction coefficient $KO_2$ (PID) and the environmental correction coefficient KECO. The corrected result is output as the fuel injection time Tout.

During the reduction treatment, the rich spike controller 118 stops the rich spike control and outputs the initial value of "1" as the reduction correction coefficient KCATRD based on the input of the forced termination signal Sc from the lean start detector 112. Similarly, the PID controller 120 stops the PID control based on the input of the forced termination signal Sc and outputs the initial value of "1" as the PID correction coefficient $KO_2$.

In a stage where the output value $SVO_2$ becomes the target value Vsto, the resumption determination unit 122 outputs a control resume signal Se to the sliding mode controller 100, outputs a second switching signal Sh2 to the switching unit 114, and output a reset signal Sr to the accumulated-oxygen-amount estimator 124. The sliding mode controller 100 resumes the $O_2$ feedback control according to the sliding mode, based on the input of the control resume signal Se from the resumption determination unit 122. The switching unit 114 switches to the output from the sliding mode controller 100 based on the input of the second switching signal Sh2. Accordingly, the output from the sliding mode controller 100 is input to the first multiplier 105 through the switching unit 114 as the correction coefficient $KO_2$. More specifically, the basic fuel injection amount TIMB is corrected with the correction coefficient $KO_2$ from the sliding mode controller 100 and with the environmental correction coefficient KECO that includes the water temperature, the intake air temperature, the atmospheric pressure, and similar parameter, so as to be output as the fuel injection time Tout.

On the other hand, the accumulated-oxygen-amount estimator 124 includes a count-value accumulator 130 and a count-value corrector 132.

The count-value accumulator 130 reads the count value from a counter table 134 for every cycle, based on the input of the count start signal Sb from the lean start detector 112, and outputs the count value to the counter 126. The counter 126 adds (accumulates) the received count value to the current count. Here, one cycle means a sequence of strokes of an intake stroke, a compression stroke, an expansion stroke, and an exhaust stroke of the engine 28. The counter table 134 is constituted such that, similarly to the basic fuel injection map 106, the count values specified by the engine rotational number NE and the throttle angle TH are arrayed. The array of the count values is an array where, basically, the count value decreases with increasing engine rotational number NE and the count value increases while the throttle angle TH increases from a completely closed state toward a completely open state. Accordingly, the counter 126 accumulates the count value corresponding to the engine rotational number NE and the throttle angle TH for every cycle.

The count-value accumulator 130 stops the accumulation of the count value at the counter 126, based on the input of the reduction-treatment start signal Sd from the reduction-treatment-start requesting unit 116. In this stage, the accumulated oxygen amount of the catalyst 50 at the point in time t1 when the reduction treatment is started is estimated.

The count-value accumulator 130 resets the count value at the counter 126 to the initial value of "0" based on the input of the reset signal Sr from the resumption determination unit 122.

The count-value corrector 132 corrects the count value at the time point t3, at which the reduction treatment is terminated, to a value corresponding to the output value $SVO_2$ based on the input of the forced termination signal Sc from the lean start detector 112 or the normal termination signal Sf from the rich spike controller 118.

Figure 5:
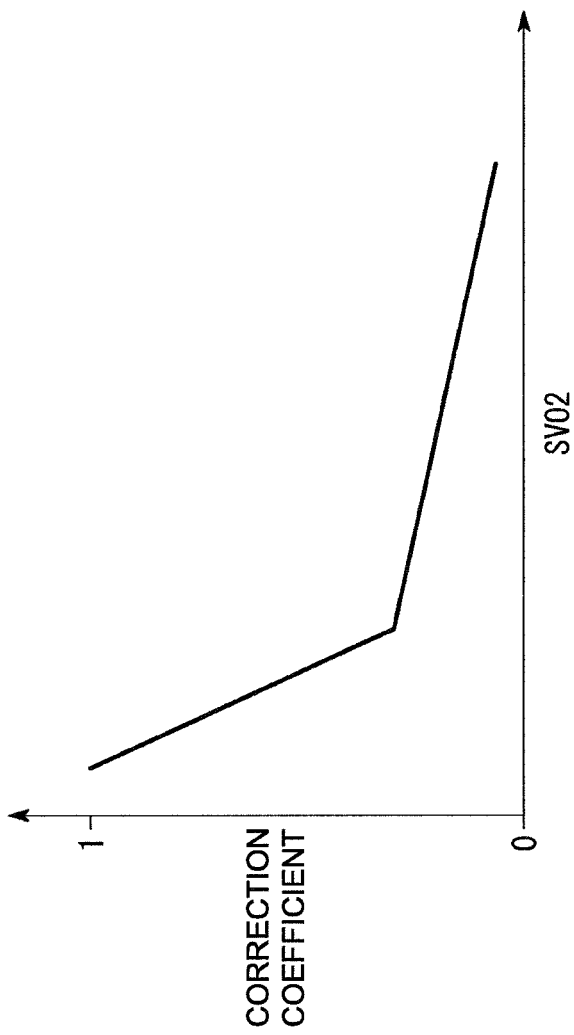
FIG. 5 is a graph illustrating a property of a count-value correction map used in a count-value corrector.

This count-value corrector 132 uses the count-value correction map 136. The count-value correction map 136 has a configuration where, as illustrated in FIG. 5, correction coefficients are arrayed corresponding to the output value $SVO_2$. The count-value correction map 136 has a property where the correction coefficient decreases with increasing output value $SVO_2$. In the count-value correction map 136, the range of the output value $SVO_2$ is a range from an output value $SVO_2$ corresponding to over lean (the air-fuel ratio: 1.85) to an output value $SVO_2$ corresponding to the second threshold Vth2. The correction coefficient has a range larger than 0 and equal to or less than 1 (the upper limit value=1). The correction coefficient decreases to 0 with increasing output value $SVO_2$. Especially in the region with the low output value $SVO_2$, the correction coefficient decreases steeply with increasing output value $SVO_2$. In the region with the output value $SVO_2$ close to the second threshold Vth2, the correction coefficient gently decreases with increasing the output value $SVO_2$ in this property. The example of FIG. 5 describes an example that has a linear property with a large gradient in the region with the low output value $SVO_2$ and has a linear property with a small gradient in the region with the output value $SVO_2$ close to the second threshold Vth2.

The count-value corrector 132 reads out the current count value from the counter 126 based on the input of the forced termination signal Sc from the lean start detector 112 or the normal termination signal Sf from the rich spike controller 118, and reads out the correction coefficient corresponding to the current output value $SVO_2$ from the count-value correction map 136. The count-value corrector 132 multiplies the count value by the correction coefficient so as to correct the count value, and stores the corrected count value in the counter 126.

Next, a description will be given of a processing operation of the lean management unit 104 by referring to a flowchart in FIG. 6.

Figure 6:
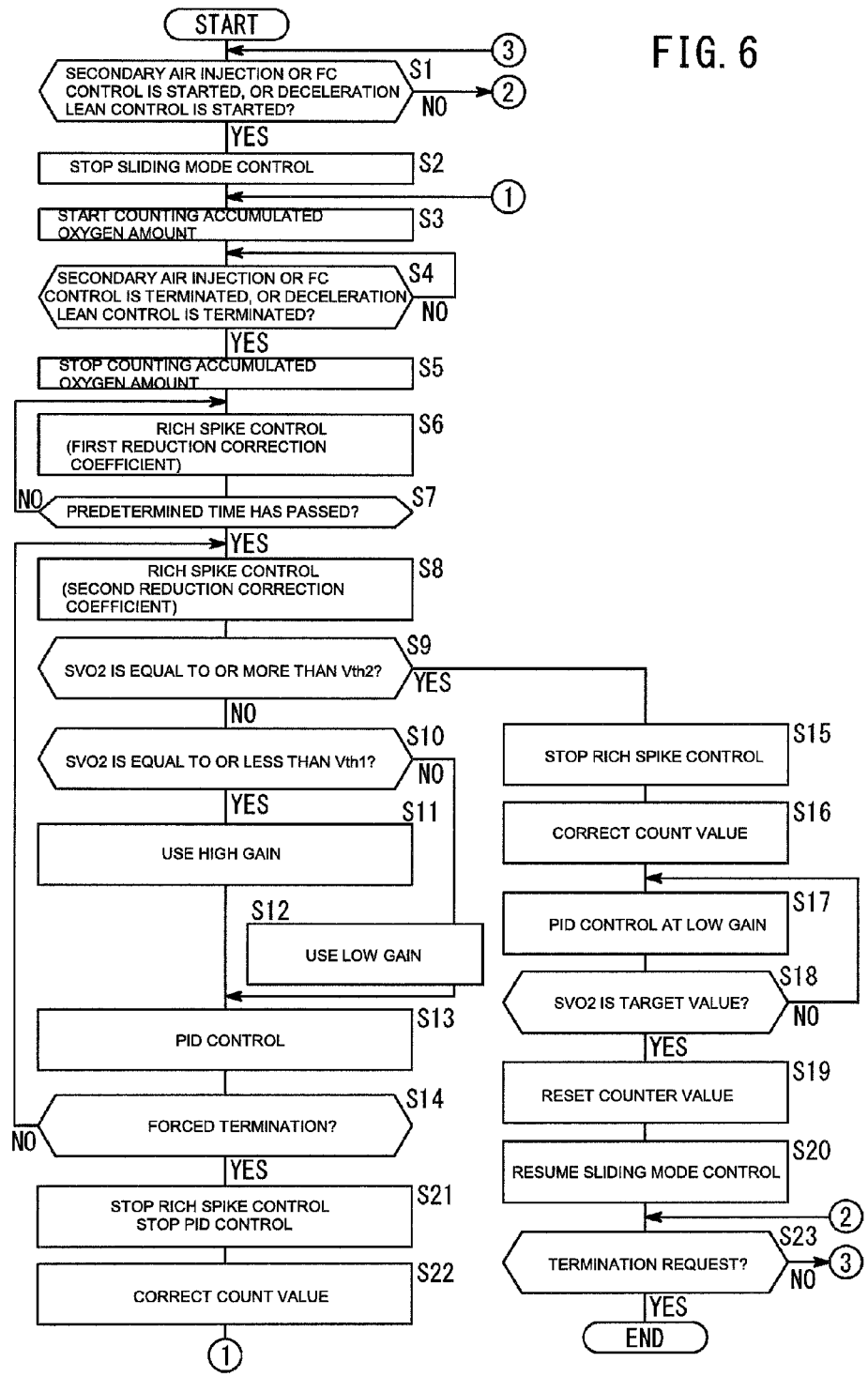
FIG. 6 is a flowchart illustrating a processing operation of the exhaust emission purification control device (the exhaust emission purification controller) according to this embodiment.

First, in step S1 of FIG. 6, the lean start detector 112 determines whether or not the injection of secondary air, the FC control, or the deceleration lean is started. This determination is made whether there has been the input of the AI start signal Sais from the AI controller 1002, the input of the FC-control start signal Sfcs from the FC controller 1004, or the input of the deceleration-lean start signal Srss from the deceleration lean controller 1005.

In the case where the input of the AI start signal Sais, the input of the FC-control start signal Sfcs, or the input of the deceleration-lean start signal Srss is received, the process proceeds to subsequent step S2. Then, the sliding mode controller 100 temporarily stops the air-fuel ratio control based on the input of the control-stop request signal Sa from the lean start detector 112. At this time, the switching unit 114 switches to the output from the lean management unit 104 based on the input of the first switching signal Sh1 from the lean start detector 112. While running the lean, for example, injection of secondary air is performed, the initial value of "1" is output from the rich spike controller 118 and the PID controller 120. Therefore, the air-fuel ratio control is set to a stopped state.

Subsequently, in step S3, the count-value accumulator 130 of the accumulated-oxygen-amount estimator 124 starts to count the accumulated oxygen amount (accumulates the count value) based on the input of the count start signal Sb from the lean start detector 112.

In step S4, the reduction-treatment-start requesting unit 116 waits for termination of the injection of secondary air, termination of the FC control, or termination of the deceleration lean. More specifically, the reduction-treatment-start requesting unit 116 waits the input of the AI end signal Saie from the AI controller 1002, the input of the FC-control end signal Sfce from the FC controller 1004, or the input of the deceleration-lean end signal Srse from the deceleration lean controller 1005.

In step S4 described above, in the case where the input of the AI end signal Saie, the input of the FC-control end signal Sfce, or the input of the deceleration-lean end signal Srse is received, the process proceeds to subsequent step S5. Then, the count-value accumulator 130 of the accumulated-oxygen-amount estimator 124 stops counting the accumulated oxygen amount (accumulation of the count value) based on the input of the reduction-treatment start signal Sd from the reduction-treatment-start requesting unit 116. The accumulation value in the counter 126 at the time point of the stop is maintained until the reduction treatment ends.

Subsequently, in step S6 and step S7, the rich spike controller 118 outputs the first reduction correction coefficient KCATRD (K1) over the predetermined time Ta. At this time, the rich spike controller 118 outputs the first reduction correction coefficient KCATRD (K1) corresponding to the count value from the accumulated-oxygen-amount estimator 124. Accordingly, the fuel injection amount is considerably increased.

In a stage after a lapse of the predetermined time Ta, the air-fuel ratio control is performed by the rich spike controller 118 and the PID controller 120 following step S8.

More specifically, in step S8, the rich spike controller 118 outputs the second reduction correction coefficient KCATRD (K2). In step S9, the rich spike controller 118 determines whether the output value $SVO_2$ is equal to or more than the second threshold Vth2. In the case where the output value $SVO_2$ is less than the second threshold Vth2, the process proceeds to the step S10. Subsequently, the PID controller 120 determines whether the output value $SVO_2$ is equal to or less than the first threshold Vth1. In the case where the output value $SVO_2$ is equal to or less than the first threshold Vth1, the process proceeds to step S11. Subsequently, the gain of the PID control is set to the high gain GH. In the case where the output value $SVO_2$ exceeds the first threshold Vth1, the process proceeds to step S12. Subsequently, the gain of the PID control is set to the low gain GL.

Subsequently, in step S13, the PID controller 120 performs the PID control at the set gain, and outputs the PID correction coefficient $KO_2$ (PID). Accordingly, the increase in fuel injection amount by the second reduction correction coefficient KCATRD (K2) is compensated with the PID correction coefficient $KO_2$ (PID). Thus, the output value $SVO_2$ approaches toward the target value Vsto at high speed. As a result, as illustrated in FIG. 4, the reduction treatment normally requires a period until, for example, the time point t4, the reduction treatment can be terminated at the time point t3 in a shorter period.

Subsequently, in step S14, the rich spike controller 118, the PH) controller 120, and the count-value corrector 132 each determine whether or not forced termination of the reduction treatment has occurred. This determination is made whether the lean start detector 112 outputs the forced termination signal Sc during the reduction treatment. In the case where the forced termination has not occurred, the process returns to the processes following step S8. The air-fuel ratio control is performed by the rich spike controller 118 and the PID controller 120.

On the other hand, in step S9 described above, in the case where the output value $SVO_2$ is determined to be equal to or more than the second threshold Vth2, the process proceeds to step S15. Subsequently, the rich spike controller 118 stops the rich spike control (the reduction treatment). Subsequently, in step S16, the count-value corrector 132 reads out the correction coefficient corresponding to the current output value from the count-value correction map 136. The count-value corrector 132 multiplies the accumulation value in the counter 126 (the count value) by the correction coefficient, so as to correct the count value. Accordingly, the accumulation value in the counter 126 where the accumulation is stopped at the starting time point t1 of the reduction treatment is corrected to an accumulation value corresponding to the second threshold Vth2.

Subsequently, in step S17, the PID controller 120 performs the air-fuel ratio control at the low gain GL. In step S18, the resumption determination unit 122 determines whether or not the output value $SVO_2$ of the $O_2$ sensor 52 has reached the target value Vsto. In the case where the output value $SVO_2$ has not reached the target value Vsto, the process returns to step S17 and then the PID control is performed. More specifically, in step S17, the PID controller 120 performs the air-fuel ratio control at the low gain GL and the corrected accumulation value is maintained until the output value $SVO_2$ reaches the target value Vsto. In this case, the output value SVO2 converges to the target value Vsto without overshooting.

Subsequently, in step S18 as described above, in the stage where it is determined that the output value $SVO_2$ has reached the target value Vsto, the process proceeds to step S19. Subsequently, the count-value accumulator 130 resets the accumulation value in the counter 126 to the initial value of "0" based on the input of the reset signal Sr from the resumption determination unit 122. In step S20, the sliding mode controller 100 resumes the air-fuel ratio control according to the sliding mode control, based on the input of the control resume signal Se from the resumption determination unit 122. At this time, the switching unit 114 switches to the output from the sliding mode controller 100 based on the input of the second switching signal Sh2 from the resumption determination unit 122. Accordingly, the basic fuel injection amount TIMB is corrected with the correction coefficient KO2 (SM) from the sliding mode controller 100 and with the environmental correction coefficient KECO that includes the water temperature, the intake air temperature, the atmospheric pressure, and similar parameter, so as to be output as the fuel injection time Tout.

Figure 7:
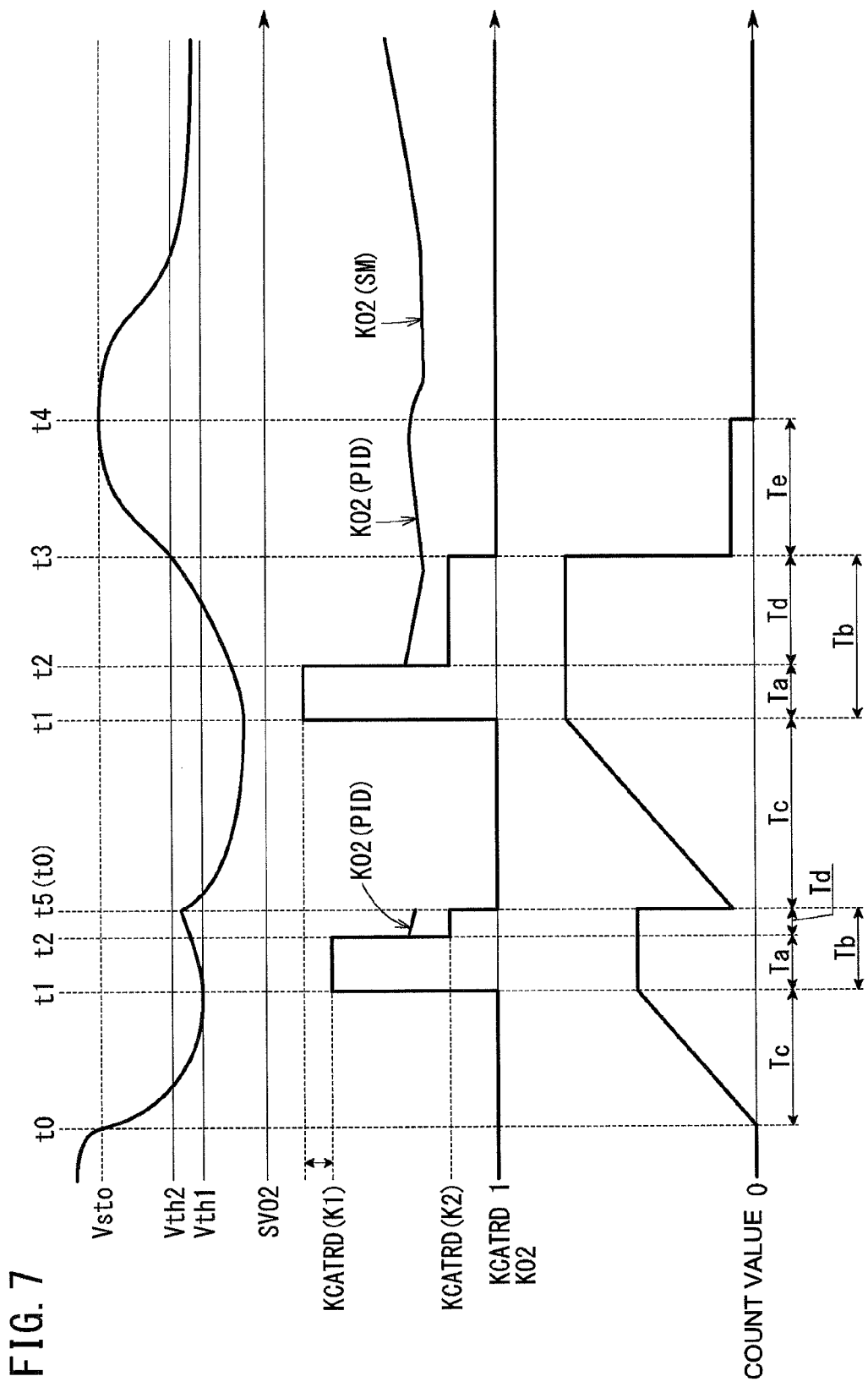
FIG. 7 is a timing chart illustrating a processing operation of the exhaust emission purification control device (the exhaust emission purification controller) according to this embodiment, especially, a processing operation in the case where the reduction treatment is forcibly terminated.

Incidentally, as illustrated in FIG. 7, in the case where the injection of the secondary air or similar process is performed again, for example, at the time point t5 during the reduction treatment, it is determined that the forced termination has occurred in step S14 of FIG. 6. Subsequently, the process proceeds to forced termination processing following step S21. More specifically, in step S21, the rich spike controller 118 and the PID controller 120 stop the rich spike control and the PID control based on the input of the forced termination signal Sc from the lean start detector 112.

In step S22, the count-value corrector 132 reads out a correction coefficient corresponding to the current output value $SVO_2$ from the count-value correction map 136 based on the input of the forced termination signal Sc. The count-value corrector 132 multiplies the accumulation value of the counter 126 (the count value) by the correction coefficient, so as to correct the count value. Accordingly, the accumulation value in the counter 126 where the accumulation is stopped in the starting time point t1 of the reduction treatment is corrected to an accumulation value corresponding to the output value $SVO_2$ at the time point t5 when the forced termination has occurred. This count correction processing allows setting an appropriate value for the count initial value when the reduction treatment is forcibly terminated and the injection of the secondary air or similar process is performed again. Accordingly, also in the case where the reduction treatment is repeated, the reduction treatment is performed with an appropriate rich injection control for the second time and thereafter.

In the stage where the correction processing on the count value in step S22 is terminated, the process returns to the processes following step S3. As illustrated in FIG. 7, after the forced termination time point t5, the processes similar to those after the above-described lean starting time point t0 in FIG. 4 are performed. In the case where the injection of the secondary air or similar process is not performed during the reduction treatment, the rich spike controller 118 and the PID controller 120 perform the air-fuel ratio control. In the stage where the output value $SVO_2$ has reached the second threshold Vth2, the accumulation value in the counter 126 is corrected to an accumulation value corresponding to the second threshold Vth2. Furthermore, in the stage where the output value $SVO_2$ has reached the target value Vsto, the accumulation value is reset to 0 and the sliding mode controller 100 resumes the air-fuel ratio control.

Subsequently, in the stage where the sliding mode controller 100 resumes the air-fuel ratio control in step S20 described above, or in the case where, in step S1, it is determined that none of the secondary air injection, the FC control, nor the deceleration lean is performed, the process proceeds to step S23. Subsequently, it is determined whether or not there is a termination request of the exhaust emission purification control device 10 (the power discontinuity, the maintenance request, or similar cause). In the case where there is no termination request, the process repeats the processes following step S1. In the stage where the termination request is issued, this processing operation is terminated in the exhaust emission purification control device 10.

Subsequently, the exhaust emission purification control device 10 for the engine 28 according to this embodiment includes the rich spike controller 118 (reduction treatment means). The rich spike controller 118 stops the sliding mode control during a specific engine control (the injection of the secondary air, the FC control, the deceleration lean control) where the air volume to be injected into the exhaust pipe 32 is increased. Subsequently, the rich spike controller 118 multiplies the fuel injection amount after the specific engine control by the reduction correction coefficient KCATRD for the open-loop control. In the exhaust emission purification control device 10 for the engine 28, the $O_2$ feedback control (the PID control by the PID controller 120) is resumed during the reduction treatment of the catalyst 50. Further, the fuel injection amount is multiplied by the $O_2$-feedback correction coefficient KO2 (PID) derived based on the deviation between the target value Vsto and the current output value $SVO_2$.

Regarding the $O_2$ sensor 52, the output value $SVO_2$ of the $O_2$ sensor 52 rapidly changes from the lean side to the rich side in proximity of the stoichiometric value. Therefore, the output value $SVO_2$ becomes the lean output during the reduction treatment. Hence, for example, setting the target value Vsto of $SVO_2$ in proximity of the stoichiometric value always causes the deviation in the feedback control, thus increasing the fuel. During the reduction treatment when the ordinary $O_2$ feedback control is originally difficult, the $O_2$ feedback control is intentionally performed simultaneously. This utilizes the deviation between the output value $SVO_2$ of the $O_2$ sensor 52, which detects the air-fuel ratio in the downstream of the catalyst 50 and the target value Vsto, so as to reduce the occurrence of the unburnt gas and perform the rich injection as much as possible in order to reduce the margin of the reduction correction coefficient KCATRD. This allows early termination of the reduction treatment.

In this embodiment, in the case where the output value $SVO_2$ of the $O_2$ sensor 52 becomes the first threshold Vth1 lower than the target value Vsto, the gain of the $O_2$ feedback control is decreased. This avoids the output value exceeding the target value Vsto, occurrence of so-called overshooting.

The reduction correction coefficients KCATRD include the first reduction correction coefficient KCATRD (K1) and the second reduction correction coefficient KCATRD (K2). The first reduction correction coefficient KCATRD (K1) is output from the reduction treatment start over the predetermined time Ta. The second reduction correction coefficient KCATRD (K2) is output after a lapse of the predetermined time Ta, and is lower than the first reduction correction coefficient KCATRD (K1). The $O_2$ feedback control during the reduction treatment is started during transition to the second reduction correction coefficient KCATRD (K2). This suppresses excessive fuel injection compared with the rich spike control only with the first reduction correction coefficient KCATRD (K1).

In this embodiment, in the stage where the output value $SVO_2$ of the $O_2$ sensor 52 becomes the second threshold Vth2 ($\geq$ the first threshold Vth1) that is lower than the target value Vsto of the $O_2$ feedback control, only the reduction treatment is terminated. More specifically, when the reduction treatment has nearly ended, the increasing correction by the reduction treatment is terminated and the $O_2$ feedback control is performed alone. This facilitates convergence to the target value Vsto while reducing overshooting.

Furthermore, this embodiment includes the accumulated-oxygen-amount estimator 124 that multiplies the count value after the secondary air injection, the FC control, or the deceleration lean control by the correction coefficient derived from the output value $SVO_2$ of the $O_2$ sensor 52 during termination of the reduction treatment, so as to estimate the accumulated oxygen amount during the termination of the reduction treatment. More specifically, during performing AI, during performing the FC control, or during performing the deceleration lean control, the accumulated oxygen amount is estimated with addition by the counter 126. This value is maintained during the reduction treatment. The correction coefficient is derived from the output value $SVO_2$ of the $O_2$ sensor 52 during the normal state or the forced termination of the reduction treatment, and multiplied by the count value. This allows an estimation of the accumulated oxygen amount during the termination of the reduction treatment. The output value $SVO_2$ of the $O_2$ sensor 52 relates to the accumulated oxygen amount in the catalyst 50. Therefore, referring to the output of the $O_2$ sensor 52 during the termination of the reduction treatment allows comparatively accurate estimation of the state of the catalyst 50. This eliminates the need for calculation of the accumulated oxygen amount in the catalyst 50 during every reduction treatment while allowing estimation of the accumulated oxygen amount during the termination of the reduction treatment, thus accurately estimating the accumulated oxygen amount with a simple method.

In this embodiment, the corrected value of the count value when the reduction treatment is forcibly terminated due to reinjection of the secondary air, reperformance of the FC control, or reperformance of the deceleration lean control is set to the initial value of the count value during the reinjection of the secondary air, the reperformance of the FC control, or the reperformance of the deceleration lean control. Accordingly, during the reinjection of the AI, the reperformance of the FC control, or the reperformance of the deceleration lean control after the reduction treatment is forcibly terminated, the initial value of the counter 126 is set properly. Accordingly, in the case where the reduction treatment is repeated, the reduction treatments for the second time and thereafter can be performed with appropriate rich injection control.

After the reduction treatment, in the stage where the output value $SVO_2$ of the $O_2$ sensor 52 has reached the target value Vsto (the stoichiometric output), the counter 126 is reset to zero. This allows appropriate count from the state where the count value is zero during the subsequent AI injection, during the subsequent FC control, or during the subsequent deceleration lean control.

The correction coefficient during the termination of the reduction treatment is set to decrease with increasing output value $SVO_2$ of the $O_2$ sensor 52. Since the air-fuel ratio is shifted to the richer side as the output value $SVO_2$ of the $O_2$ sensor 52 increases, the accumulated oxygen amount in the catalyst 50 is estimated to be low. Accordingly, setting the correction coefficient during the termination of the reduction treatment to decrease with increasing output value $SVO_2$ of the $O_2$ sensor 52 allows accurately setting the correction coefficient.

Additionally, the relationship of the correction coefficient to the output value SVO2 of the O2 sensor 52 during the termination of the reduction treatment has a property where the correction coefficient steeply decreases with increasing output value $SVO_2$ of the $O_2$ sensor 52 in the region with the low output value $SVO_2$ of the $O_2$ sensor 52 while the correction coefficient gently decreases with increasing output value $SVO_2$ of the $O_2$ sensor 52 in the region with the high output value $SVO_2$ of the $O_2$ sensor 52. This allows more accurately setting the correction coefficient.

The exhaust emission purification control device for the engine according to the present invention is not limited to the aforementioned embodiments. Obviously, various configurations are possible without departing from the scope of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust emission purification control device for an engine, comprising:
   a secondary air injector disposed in an upstream side of a catalyst and an $O_2$ sensor disposed in a downstream side of the catalyst, the catalyst being disposed at an exhaust pipe of an engine, the secondary air injector being configured to inject secondary air into an exhaust path, the $O_2$ sensor being configured to detect an air-fuel ratio; and an electronic control unit programmed to execute control of the exhaust emission purification control device, the electronic control unit including:
   an accumulated-oxygen-amount counter for estimating an accumulated-oxygen-amount count value in the catalyst during the secondary air injection;
   a reduction treatment injector for performing rich injection after the secondary air injection,
   an estimator for estimating an accumulated amount at terminating time of reduction treatment for multiplying the accumulated-oxygen-amount count value after the secondary air injection by a correction coefficient so as to estimate the accumulated oxygen amount at a terminating time of reduction treatment, the correction coefficient being derived from an output of the $O_2$ sensor at the terminating time of the reduction treatment,
   wherein the correction coefficient at terminating time of the reduction treatment is set to decrease with increasing output of the $O_2$ sensor, and
   wherein a relationship of the correction coefficient to the output of the $O_2$ sensor at the terminating time of the reduction treatment has a property where the correction coefficient steeply decreases with increasing output of the $O_2$ sensor in a region with a low output of the $O_2$ sensor while the correction coefficient gently decreases with increasing output of the $O_2$ sensor in a region with a high output of the $O_2$ sensor.

2. The exhaust emission purification control device for the engine according to claim 1, wherein an estimation value of an accumulated amount at the terminating time of the reduction when the reduction treatment is forcibly terminated due to reintroduction of the secondary air is set to a counter initial value during the reintroduction of the secondary air.

3. The exhaust emission purification control device for the engine according to claim 1, wherein the counter is reset to zero in a stage where the output of the $O_2$ sensor has reached a theoretical air-fuel ratio output after the reduction treatment.

4. An exhaust emission purification control device for an engine, comprising:
   a throttle disposed at an intake pipe of an engine, the throttle being configured to adjust an intake air volume;
   an $O_2$ sensor disposed in a downstream side of a catalyst, the catalyst being disposed at the exhaust pipe, the $O_2$ sensor being configured to detect an air-fuel ratio;
   an injection-amount reducing injector for cutting or reducing a fuel injection amount by running lean in a completely closed state of the throttle;
   accumulated-oxygen-amount counter for estimating an accumulated-oxygen-amount count value in the catalyst during reducing the injection amount;
   reduction treatment injector for performing rich injection after the reduction in injection amount,
   means to estimate accumulated amount at terminating time of reduction treatment for multiplying the accumulated-oxygen-amount count value after the reduction in injection amount by a correction coefficient so as to estimate the accumulated oxygen amount at a terminating time of reduction treatment, the correction coefficient being derived from an output of the $O_2$ sensor at the terminating time of the reduction treatment,
   wherein the correction coefficient at terminating time of the reduction treatment is set to decrease with increasing output of the $O_2$ sensor, and
   wherein a relationship of the correction coefficient to the output of the $O_2$ sensor at the terminating time of the reduction treatment has a property where the correction coefficient steeply decreases with increasing output of the $O_2$ sensor in a region with a low output of the $O_2$ sensor while the correction coefficient gently decreases with increasing output of the $O_2$ sensor in a region with a high output of the $O_2$ sensor.

5. The exhaust emission purification control device for the engine according to claim 4, wherein an estimation value of an accumulated amount at the terminating time of the reduction when the reduction treatment is forcibly terminated due to reintroduction of the secondary air is set to a counter initial value during the reintroduction of the secondary air.

6. The exhaust emission purification control device for the engine according to claim 4, wherein the counter is reset to zero in a stage where the output of the $O_2$ sensor has reached a theoretical air-fuel ratio output after the reduction treatment.

7. An exhaust emission purification device for an engine, comprising:
   $O_2$ feedback controller that includes an $O_2$ sensor configured to detect an air-fuel ratio in a downstream side of a catalyst, the catalyst being disposed at an exhaust pipe of an engine, the $O_2$ feedback controller being for performing feedback control such that an output of the $O_2$ sensor becomes a target value; and
   reduction treatment injector for stopping the $O_2$ feedback control during a specific engine control for increasing an air volume injected into the exhaust pipe and then multiplying a fuel injection amount after the specific engine control by a reduction-rich correction coefficient of an open-loop control;

wherein the $O_2$ feedback control is resumed during reduction treatment of the catalyst;

the fuel injection amount is further multiplied by an $O_2$-feedback correction coefficient (KO$_2$ (PID)), the $O_2$-feedback correction coefficient being derived based on a deviation between a target $O_2$ sensor output and a current $O_2$ sensor output, and wherein as the reduction-rich correction coefficient, a first rich correction coefficient (KCATRD (K1)) is provided at a starting time point of the reduction treatment, and a second rich correction coefficient (KCATRD (K2)) is provided after a lapse of a predetermined time (Ta), the second rich correction coefficient (KCATRD (K2)) being lower than the first rich correction coefficient (KCATRD (K1)); and the $O_2$ feedback control during the reduction treatment is started during a transition to the second rich correction coefficient (KCATRD (K2)).

8. The exhaust emission purification device for the engine according to claim 7, wherein when an output of the $O_2$ sensor becomes a first output value (Vth1) lower than the target value and the gain of the $O_2$ feedback control is decreased.

9. The exhaust emission purification device for the engine according to claim 7, wherein in a case where an output of the $O_2$ sensor becomes a second output value (Vth2) lower than the target value (Vsto) of the $O_2$ feedback control, only the reduction treatment is terminated.

10. A method for exhaust emission purification for an engine, comprising:

positioning a secondary air injector in an upstream side of a catalyst;

positioning an $O_2$ sensor in a downstream side of the catalyst;

mounting the catalyst relative to an exhaust pipe of an engine;

configuring the secondary air injector to inject secondary air into an exhaust path, the $O_2$ sensor being configured to detect an air-fuel ratio;

providing an accumulated-oxygen-amount counter for estimating an accumulated-oxygen-amount count value in the catalyst during the secondary air injection;

proving a reduction treatment means for performing rich injection after the secondary air injection; and estimating an accumulated amount at terminating time of reduction treatment for multiplying the accumulated-oxygen-amount count value after the secondary air injection by a correction coefficient so as to estimate the accumulated oxygen amount at a terminating time of reduction treatment, the correction coefficient being derived from an output of the $O_2$ sensor at the terminating time of the reduction treatment, wherein the correction coefficient at terminating time of the reduction treatment is set to decrease with increasing output of the $O_2$ sensor, and wherein a relationship of the correction coefficient to the output of the $O_2$ sensor at the terminating time of the reduction treatment has a property where the correction coefficient steeply decreases with increasing output of the $O_2$ sensor in a region with a low output of the $O_2$ sensor while the correction coefficient gently decreases with increasing output of the $O_2$ sensor in a region with a high output of the $O_2$ sensor.

11. The method of exhaust emission purification for the engine according to claim 10, wherein an estimation value of an accumulated amount at the terminating time of the reduction when the reduction treatment is forcibly terminated due to reintroduction of the secondary air is set to a counter initial value during the reintroduction of the secondary air.

12. The method of exhaust emission purification for the engine according to claim 10, wherein the counter is reset to zero in a stage where the output of the $O_2$ sensor has reached a theoretical air-fuel ratio output after the reduction treatment.

* * * * *